United States Patent [19]
Fisk et al.

[11] Patent Number: 5,310,985
[45] Date of Patent: May 10, 1994

[54] PROCESS FOR JOINING COPPER ALLOYS

[75] Inventors: Brian Fisk, Franlin Lakes, N.J.; Joseph Winter, New Haven, Conn.

[73] Assignee: Fisk Alloy Wire, Inc., Hawthorne, N.J.

[21] Appl. No.: 48,816

[22] Filed: Apr. 16, 1993

[51] Int. Cl.$^5$ .............................................. B23K 11/02
[52] U.S. Cl. .................................. 219/117.1; 219/58; 219/118; 228/235.1
[58] Field of Search ............... 219/118, 105, 101, 107, 219/117.1, 100, 104, 57, 58, 56.1, 56.21; 228/156, 158, 234, 243, 263.18, 193; 140/112

[56] References Cited
U.S. PATENT DOCUMENTS
4,269,344  5/1981  Vervliet ................................ 228/158

FOREIGN PATENT DOCUMENTS
1500678  6/1966  Fed. Rep. of Germany ...... 219/118
37-3362  2/1962  Japan ................................ 219/104
4-251679  9/1992  Japan ................................ 219/118

Primary Examiner—Geoffrey S. Evans
Attorney, Agent, or Firm—Bachman & LaPointe

[57] ABSTRACT

End faces of copper alloys to be used for electrical conductors are placed in contacting relationship under a compressive force below the yield strength of the copper alloy conductor in the room temperature condition. The contacting end faces are heated under continuous compression at a temperature of at least 300° C. but below the solvus temperature of the copper alloy in at least one heating cycle.

16 Claims, 1 Drawing Sheet

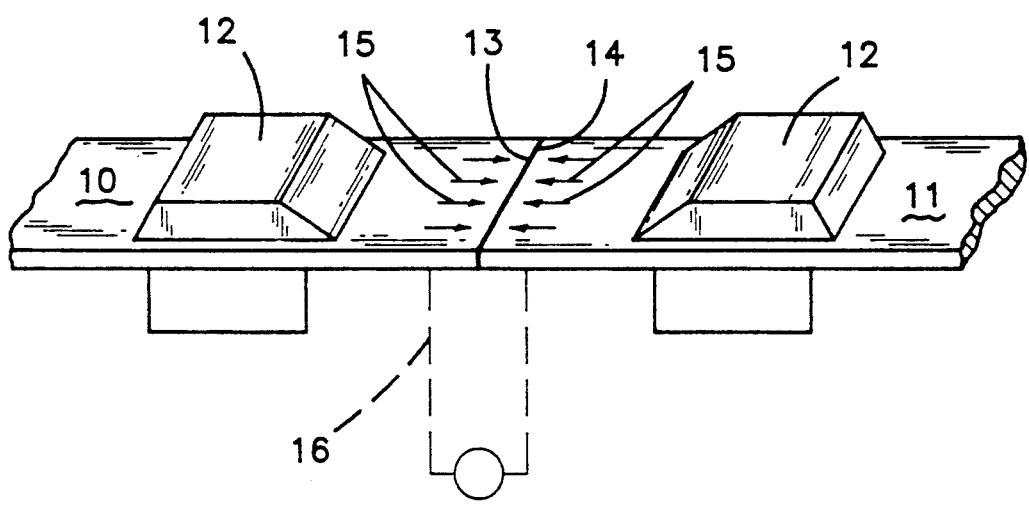

PROCESS FOR JOINING COPPER ALLOYS

BACKGROUND OF THE INVENTION

The present invention provides a process for joining dilute copper based alloys to be used for electrical conductors, such as wire and cable, to produce long coils of wire and shaped wire products. The process achieves high strength welds close to parent properties and characteristics without the need for heat or mechanical treatment to restore properties to the weld and its adjacent zone typical of current welding practices.

Electrical connector and conductor applications which are not satisfied by commercially pure copper are increasingly being replaced by dilute alloys of copper. These alloys have less than 20% alloying content (80% copper based) and usually have less than 5.0% alloying content. The alloying addition is designed to strengthen the structure by precipitation and/or particle or work hardening, thereby only minimally impacting conductivity.

The process involved in making or maintaining long coils of these alloys requires coil butt welding. Due to the nature of the drawn and shaped wire forming processes or cabling procedures and to assure economics, these end butt welds should desirably be done so as not to degrade the metal properties in the weld region. Naturally, also, the weld structure should be as close to the parent structure in mechanical and electrical properties as possible. Specifically, a weld zone of heat affected metal resulting from a fusion bonding process would adversely affect mechanical properties and especially electrical conductivity. Cold pressure welding, which is significantly more difficult to do in large or non-round configurations, also yields significant increases in strain hardening with concomitant loss in ductility in the weld zone.

One can overcome the above deficiencies by subsequent heat treating procedures or cold work on the entire coil, but this is expensive and time consuming and can create other problems.

Accordingly, it is a principal object of the present invention to provide a process for joining copper alloy electrical conductors in strip, rod or wire form.

It is a particular object of the present invention to provide a process as aforesaid which provides a joined copper alloy conductor having good strength and conductivity properties.

It is a still further object of the present invention to produce coils of joined copper alloy conductor.

It is also an object of the present invention to provide a process as aforesaid which is convenient and expeditious to practice.

Further objects and advantages of the present invention will appear hereinbelow.

SUMMARY OF THE INVENTION

In accordance with the present invention, the foregoing objects and advantages are readily obtained.

The present invention is a process for joining dilute copper based alloys to be used for electrical connectors or electrical conductors, such as wire and cable. In accordance with the present process the end faces of copper alloys to be joined are placed in contacting relationship under a continuous compressive force which is not above the yield strength of the copper alloy in the room temperature condition. The copper alloy conductor to be joined contains less than 20% and generally less than 5.0% alloying additions. The contacting end faces are heated at a temperature of at least 300° C. but below the solvus temperature of the copper alloy in at least one heating cycle, which results in upsetting of the contacting faces. The term "upsetting" contemplates mashing or pressing together the contacting faces with the extrusion of metal flash. Generally 1-3 heating, upset cycles are used, with each cycle being preferably less than 30 seconds duration. The contacting end faces form a joined copper alloy conductor with improved weld integrity and with good strength and conductivity properties.

Since flash will generally form at the joined end faces, the subject process includes the step of removing the flash at the joined end faces.

Preferably, a temperature of about 300° to 850° C, is employed and preferably the heating at the end faces is provided by passing an electrical current across the contacting end faces to provide resistance heating at the interface between the contacting end faces.

The present invention also includes joined copper alloy electrical conductor and strip prepared by the aforesaid process, wherein the strip has a width which is no greater than 20 times thickness.

Further features of the present invention will appear hereinbelow.

BRIEF DESCRIPTION OF THE DRAWINGS

The accompanying drawing illustrates the process of the present invention.

DETAILED DESCRIPTION

The present invention joins copper alloy electrical conductors to enable the production of long coils of copper alloy electrical conductor with good strength and electrical conductivity properties at the joined interface. The term "electrical conductor" is intended to encompass electrical connectors or electrical conductors such as wire, cable, strip or shaped wire products derived from these forms. For example, wire and cable, fabricated conductor cables, pins fabricated from shaped wire, or wire whose objective is power or signal transmission.

The copper alloys processed in accordance with the present invention have less than 20% alloying content and generally less than 5.0%. The alloying addition or additions are generally designed to strengthen the structure by precipitation or work or particle hardening, thereby only minimally impacting electrical conductivity. Typical alloying additions include small amounts, generally at least 0.01% each, of at least one of tin, iron, zirconium, phosphorus, cadmium, beryllium, silver, and/or magnesium. These will normally go into solution at elevated temperature during fabrication and then are precipitated out at low or moderate temperature to achieve electrical conductivity objectives. Naturally, the usual impurities may be tolerated.

In accordance with the present invention, end faces of the aforesaid electrical conductors to be joined are placed in contacting relationship under a continuous compressive force generally of at least 500 psi and generally between 10,000 and 40,000 psi, but below the room temperature condition yield strength of the copper alloy being joined. The continuous compressive force is preferably at approximately 50% of the room temperature yield strength of the materials. In accordance with the present invention one must have the application of continuous force to allow metal movement at the contacting zone. The butt ends of the alloy conductors to be joined are rigidly clamped with the butt faces in contact and with the butt faces simultaneously subjected to a compressive force as above, such as pneumatically applying live force to the butt faces. Naturally, the contacting faces may have any desired configuration which preferably should closely match, for example, rectangular or round.

The contacting faces, under continuous compression, are heated at a temperature of at least 300° C. and generally between 400°-800° C., but below the solvus temperature of the particular copper alloy conductor being joined. Preferably, the heating at the end faces is provided by passing an electrical current across the contacting end faces to provide resistance heating at the interface between the contacting end faces, although any other localized heating method is suitable, as induction or torch heating. As soon as the heated end faces reach their flow stress under the applied dynamic or live compressive force they will join together extruding flash at the interface. Different alloys naturally have different flow stress/temperature relationships. Thus, specific processing conditions will vary within the scope of the present invention to accommodate this and to insure welding below the solvus temperature. This may take only a fraction of a second and generally not longer than about 15-30 seconds.

The foregoing is considered one heating cycle. Generally, as many as three heating and compressing cycles may be used, with preferred practice using two heating cycles, with reclamping for each cycle and applying the live compressive force during each cycle to further upset the engaged interface.

Flash may be removed by any convenient method, as by shearing, grinding or the like.

In accordance with the foregoing, an improved, joined copper alloy electrical conductor is obtained enabling one to obtain long coils of the joined material. The resultant product is characterized by good strength and electrical conductivity properties at the joined interface. In addition, since the work piece never sees temperatures above the solvus temperature of the alloy, precipitates or alloying particulate will not be dissolved. Further, the thermal excursion which is inherent in the foregoing procedure is lower than the recrystallization temperature, and of very short duration. Therefore, the cold work inherent to the parent material will be retained. In addition, multiple cycles as aforesaid will assure that no oxidized intersurface material is available to adversely degrade the weld.

Further features and advantages of the present invention will appear from the following illustrative examples.

EXAMPLE 1

In this example, end faces of rectangular cross section, copper alloy strip having dimensions of about 0.5 inch by 0.125 inch, were rigidly clamped together with the butt faces in contact. The copper alloy contained about 98.8% copper, plus alloying additions of 0.8% iron, 0.2% phosphorus and 0.1% magnesium, plus impurities. The rigidly clamped butt faces were simultaneously with clamping subjected to a dynamic compressive force of about 1500 pounds of live force applied pneumatically. Electrical current was then passed across the butt faces to provide resistance heating at the interface to be joined. As soon as the heated strip reached its elevated temperature flow stress under compressive force, it joined together extruding flash, and two cycles performed.

This is shown in the drawings wherein copper alloy strip 10, 11 are rigidly clamped together by clamping means 12 with the butt faces 13 and 14 in contact. The clamped faces are subjected to compressive force along arrows 15 and electrical current passed across the butt faces via circuit 16.

Several different tests were performed as shown in Table I, below. The temperature at the interface depends on the power settings. Test III represents the parent material.

TABLE I

| | | POWER | | | |
|---|---|---|---|---|---|
| TEST | UPSET FORCE (LBS.) | AMPS AT 460 V | PEAK TEMP | % IACS CONDUCTIVITY | TENSILE STRENGTH PSI |
| IA | 1500 | 70 | 538° C. | 72.1 | 39250 |
| IB | 1500 | 70 | 593° C. | 75.9 | 37441 |
| IIA | 1350 | >300 | >MP | 61.6 | 33868 |
| IIB | 1350 | >300 | >MP | 63.9 | 32015 |
| III | UNWELDED PARENT MATERIAL | | | 78.9 | 41676 |

This shows that the fusion welded samples as characterized by samples IIA and IIB, when compared with the parent sample III, reveal significant decrease in conductivity attributable to solutionizing the dilute alloying additions with concomittment sharp decrease in UTS due to the elevated temperature exposure.

Samples IA and IB were pressure welded at temperatures well below its solvus and show only slight decrease in conductivity and tensile strength compared to the cold worked parent specimen III.

Good welds were obtained by all samples.

Power settings of >300 resulted in interfacial melting at the end faces. Power settings of 70 amps were dull red at the interface.

EXAMPLE 2

A dilute copper alloy containing about 99.8% copper, 0.10% nominal zirconium plus usual impurities was processed in a manner after Example 1. The solvus temperature for this alloy is about 900° C. Properties for this alloy as a function of thermal exposure remain relatively consistent until about 400° C., above which the properties tend to drop gradually. The results are shown in Table II.

TABLE II

| | | POWER | | | |
|---|---|---|---|---|---|
| TEST | UPSET FORCE (LBS.) | AMPS AT 460 VOLT | PEAK TEMP | % IACS CONDUCTIVITY | TENSILE STRENGTH PSI |
| IVA | 1500 | 62 | 630° C. | 80.6 | 42985 |
| IVB | 1500 | 62 | 627° C. | 82.44 | 42956 |
| VA | 1350 | 300 | >MP | 73.55 | 30279 |
| VB | 1350 | 300 | >MP | 75.72 | 23868 |
| VI | UNWELDED PARENT METAL | | | 90.86 | 58191 |

This shows that the fusion welded samples as characterized by samples VA and VB, when compared with the parent sample VI, reveal significant decrease in conductivity attributable to solutionizing the zirconium alloying addition with concomittment sharp decrease in UTS due to the elevated temperature exposure.

Samples IVA and IVB were pressure welded at temperatures well below its solvus and show only slight decrease in conductivity and tensile strength compared to the cold worked parent specimen VI.

Good welds were obtained by all samples.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. Process for joining copper alloys to be used for electrical conductors which comprises: providing copper alloy conductors having butt end faces thereof to be joined with closely matching configurations; rigidly clamping the end faces of the alloys to be joined in contacting relationship under a compressive force but below the yield strength of the copper alloy in the room temperature condition, wherein the copper alloy to be joined contains less than about 20% alloying additions and at least 0.01% each of at least one of the alloying elements tin, iron, zirconium, cadmium, beryllium, silver and magnesium; applying heat to the contacting end faces while said end faces are under continuous compression at a temperature of at least 300° C. but below the solvus temperature of the copper alloy in at least one heating cycle while maintaining the alloying elements out of solution; whereby the contacting end faces form a joined copper alloy with good strength and conductivity properties.

2. Process according to claim 1 wherein the copper alloy is a copper alloy conductor.

3. Process according to claim 1 wherein the copper alloy conductors to be joined are heated under continuous compression of at least 500 psi.

4. Process according to claim 3 wherein 1 to 3 heating cycles are employed and each heating cycle is less than 30 seconds.

5. Process according to claim 4 wherein the alloy contains less than 5% alloying additions.

6. Process according to claim 4 wherein the continuous compressive force is at approximately 50% of the room temperature yield strength of the materials to be joined.

7. Process according to claim 1 wherein flash forms at the joined end faces and including the step of removing the flash at the joined end faces.

8. Process according to claim 1 wherein the heating temperature is from about 300°0 to 850° C.

9. Process according to claim 1 wherein the heating at the end faces is provided by passing an electrical current across the contacting end face to provide resistance heating at the interface between the contacting end faces.

10. Process according to claim 1 wherein the end faces are under a compressive force of about 10,000 to 40,000 psi.

11. Process according to claim 1 including the step of forming the joined copper alloy conductor into a coil of copper alloy conductor.

12. Process according to claim 1 wherein the end faces are planar.

13. Process according to claim 12 wherein the end faces are selected from the group consisting of rectangular and round.

14. Process according to claim 1 wherein a preliminary step of cold working the copper alloys has been performed.

15. Process according to claim 1 including the step of upsetting the contacting end faces during said heating.

16. Process according to claim 1 including the step of maintaining said heating temperature below recrystallization temperature.

* * * * *

UNITED STATES PATENT AND TRADEMARK OFFICE
CERTIFICATE OF CORRECTION

PATENT NO. : 5,310,985

DATED : MAY 10, 1994

INVENTOR(S) : BRIAN FISK ET AL.

It is certified that error appears in the above-identified patent and that said Letters Patent is hereby corrected as shown below:

On the Cover Page, the address for Brian Fisk should read --Franklin Lakes--.

In Column 6, claim 8, line 14, "300°0" should read --300°--.

In Column 6, claim 10, line 21, after "faces are" --placed-- should be inserted.

Signed and Sealed this

Twenty-second Day of November, 1994

Attest:

BRUCE LEHMAN

Attesting Officer     Commissioner of Patents and Trademarks